3,400,197
COMPRESSIBLE SUSTAINED RELEASE PHARMACEUTICAL TABLET LIPID-COLLOIDAL SILICA GEL MATRIX FRAGMENT GRANULES
Irwin Lippmann, Bon Air-Midlothian, Va., assignor to A. H. Robins Company, Inc., Richmond, Va., a corporation of Virginia
No Drawing. Filed Jan. 26, 1965, Ser. No. 428,210
7 Claims. (Cl. 424—21)

ABSTRACT OF THE DISCLOSURE

Composition for internal administration to a living animal body which when administered provides sustained release of the pharmaceutically active agent contained therein, the composition comprising the pharmaceutically active agent dispersed in a solid matrix comprising a pharmaceutically acceptable lipid and colloidal silica, the ratio by weight of lipid to silica being about 3:1 to 8:1, and such compositions in the form of tablets having a core as described with a coating comprising the pharmaceutically active agent in a pharmaceutically acceptable carrier providing rapid release of the pharmaceutically active agent.

---

This invention relates to medicinal treatment, and is more particularly concerned with a composition suitable for being prepared in dosage form comprising a pharmaceutically (pharmacologically) active agent and a matrix type carrier therefor, the composition being so constituted that when it is administered internally, sustained release of the pharmaceutically (pharmacologically) active agent takes place over a desired period of time.

In administering medicinal agents orally, it is often desirable to provide the dosage in a form in which the active ingredient is released to the body at a retarded rate over a sustained period. This is desirable for several reasons. First, a large dose may be administered which will maintain the pharmaceutically (pharmacologically) active agent in the system at a predetermined level of activity. Second, the desired level of activity may be maintained for a desired period of time even though a smaller number of doses are administered, thereby enabling patients to carry out daily routine activities without concern for frequent medication administration. Sustained release is also important where it may be injurious to the patient to disturb him at frequent intervals for drug administration, or under crowded hospital conditions where frequent administration places a burden upon the hospital personnel. Moreover, where highly potent drugs are administered, the sustained or retarded release of such drugs prevents undesired concentrations of the active drug, or concentrations sufficient to produce undesired side effects, from being released at any given time.

A number of methods have been developed in the prior art for the sustained release of a medicinal agent administered internally. In one method a plurality of relatively inert particles, to which the particular drug or medicinal agent has been applied, are formed into a unit dosage. Some of the particles are designed to release the drug immediately after administration, while the remaining particles are designed to release the drug after each of several time interval lags. This type of dosage medium is prepared either by coating drug-delaying materials upon the drug particles to varying controlled thicknesses, or by granulating drug particles with varying amounts of drug-delaying materials. Final blends of immediate release portions and various delaying portions are then measured and unit dosages prepared from the blends. This method has several disadvantages. The preparation of the different time-releasing fractions and their subsequent blending are very laborious. Additionally, the rate of active ingredient release of the dosages may not always be reproducible due to the technical difficulty in evenly distributing the variously-timed granules in each particular dosage unit, and due to imperfections in coatings or lack of homogeneity in granulations.

As a means of avoiding some of the difficulties described, drug action has been sustained by chemical interaction of the drug with certain innocuous materials. In one form the drug is prepared in the form of tannates. In another method the drug is interacted with cations exchange resins. A major disadvantage of this type of sustained release dosage form is that the method is restricted to low dosage ionic drugs, and the rate of active ingredient release is almost completely dependent upon the pH of the gastrointestinal fluids, which will vary markedly in the stomach and small intestine.

Another method for providing sustained release of oral dosages is by the preparation of tablets in which the active material is retained in a matrix. The release rate is then controlled by controlling the rate of erosion of the matrix, rate of active ingredient diffusion from the matrix, or both. Thus a hydrophylic gum may be utilized as the primary agent in the matrix, water-insoluble materials may be so utilized, or a variation of these approaches, i.e., blends of both hydrophylic gums and water-insoluble materials, may be utilized as the primary agents in the matrix.

It is an object of the invention to provide a composition comprising a pharmaceutically active agent which, when administered internally, will release the active agent at a retarded rate. It is a further object to provide such a composition which may be formed into tablets by more or less conventional means, but yet which tablets will provide more consistent and more predictable retarded or sustained release of the active agent over the release period than prior art tablets. It is still a further object to provide such a composition wherein the length of the release period may be precisely controlled. It is an additional object to provide such a composition wherein the release rate and period are precisely reproducible. It is an additional object to provide a composition of the type described which is adaptable for use with a large variety of drugs and other medicinal agents of diverse physical and chemical properties. It is still another object to provide such a composition which may be readily and inexpensively manufactured and which requires only a small number of manufacturing operations. It is a further object to provide a method for administering pharmaceutically active agents over a sustained release period. Additional objects will be apparent to one skilled in the art and still others will become apparent hereinafter.

According to the present invention, a pharmaceutically active agent such as a drug or other medicinal agent is incorporated into a matrix comprising a gel of silica contained in a lipid material. The composition so formed is then compressed into tablets or provided in other dosage forms such as capsules, powder, liquid suspension, et cetera. The method of the invention comprises treating a living animal body by internally administering the tablets or other dosage forms of the invention described above containing the desired pharmaceutically active agent. When so administered, the tablets or other dosage forms provide sustained release of the pharmaceutically active agent over a period which may be precisely controlled by varying the matrix composition. If it is desired to provide a means for the immediate release of a fraction of the pharmaceutically active agent, the tablets or other dosage forms so provided may be utilized as cores, and an additional amount of the active agent applied over the cores in the form of a concentrated coating. The resulting coated tablet, when internally administered, provides an immediate controlled dosage of the active agent, with the remainder thereof being released at a retarded rate over the sustained period determined by the composition of the core.

The lipid materials suitable for the preparation of the matrix of the invention may be selected from the group consisting of fatty alcohols having 16 to 44 carbon atoms, fatty acids having 12 to 28 carbon atoms, esters derived from alcohols having 2 to 44 carbon atoms and acids having 2 to 28 carbon atoms, esters of aliphatic polyhydroxy compounds having 3 to 6 carbon atoms with fatty acids having 10 to 28 carbon atoms, esters of aliphatic polyhydroxy compounds having 3 to 6 carbon atoms with fatty acids having 10 to 28 carbon atoms wherein at least some of the hydroxyl groups are esterified with fatty acids containing 2 to 4 carbon atoms, and waxes. The lipid should preferably have a melting point in the range of about 50° to 90° centigrade.

Among the suitable fatty alcohols are myristyl, cetyl, stearyl, arachidyl, behenyl, carnaubyl, ceryl, melissyl and 12-hydroxystearyl alcohols.

Among the examples of suitable fatty acids are myristic, palmitic, stearic, arachidic and 12-hydroxystearic acids.

Examples of suitable esters are cetyl myristate, cetyl palmitate, cetyl stearate and stearyl stearate.

Examples of suitable esters of aliphatic polyhydroxy compounds with fatty acids are glyceryl tristearate, glyceryl distearate, glyceryl monostearate, glyceryl tripalmitate, glyceryl dipalmitate, glyceryl monopalmitate, glyceryl trimyristate, hydrogenated castor oil, hydrogenated cocoanut oil, propylene glycol distearate, and sorbitan tristearate.

Examples of suitable polyhydroxy compounds wherein some of the hydroxyl groups are esterified with fatty acids are acetylglyceryl distearate and diacetylglyceryl monostearate.

Examples of suitable waxes are paraffin wax, petrolatum wax, mineral waxes such as ozokerite, ceresin, Utah wax or montan wax, insect waxes such as beeswax or Chinese wax, and vegetable waxes such a carnauba wax or Japan wax.

Of the suitable lipids listed above, the preferred members are stearyl alcohol, cetyl alcohol, stearic acid and palmitic acid, since these materials are readily available commercially, have reproducible specifications and provide reproducible results, and are relatively inexpensive.

By far the best results are obtained by using colloidal silica having a maximum ultimate particle size of about 20 m$\mu$. The minimum ultimate particle size is not critical, and in fact, superior results may be obtained by utilizing silica having an ultimate size particle as small as is practically available. Colloidal silica has a tendency to form weak agglomerates consisting of loose clusters of particles requiring only mild energy to effect their separation. As used herein in the specification and claims, the term "ultimate particle size" denotes the size of the individual particles within the agglomerates or clusters. Commercial products having an ultimate particle size of about 2 to about 20 m$\mu$ have been found to be highly satisfactory.

In addition to particle size, a large surface area is highly desirable. Colloidal silicas having external surface areas of from about 0.1 M$^2$ (square meters)/gm. to about 3,000 M$^2$/gm. may be utilized. The preferred range is from about 100 to about 400 M$^2$/gm.

Among the suitable commercial materials available are Quso F–20 silica having an ultimate particle size of about 12 m$\mu$ and a surface area of about 325 M$^2$/gm. and Cabosil Grade M5, a pyrogenic silica (i.e., silica made by a pyrogenic process) having an ultimate particle size of about 15 m$\mu$ and a surface area of about 200 M$^2$/gm. Other products both commercial and otherwise may of course be used, those having the smallest particle sizes and the greatest surface areas generally being preferred.

One advantage in using colloidal silica is that it forms a gel within the matrix which is much more homogeneous than other forms of silica, thus producing a much more uniform composition providing more uniform release. Because of the greater uniformity, such sustained release dosages have a wider margin of safety. Moreover, greater tablet strength and a harder tablet results, thus permitting a more uniform erosive process.

Although the desired ratio by weight of lipid to silica depends somewhat on the nature of the materials themselves, as well as on the nature of the medicament, a preferred range of lipid to colloidal silica ratio by weight is about 3:1 to 8:1.

Because the present method for providing sustained release dosage units and the compositions produced thereby are not limited by the physical or chemical properties of the drugs utilized, a large number of drugs of various physical and chemical properties may be embodied therein. Following is a list of representative pharmaceuticals or drugs by generic or chemical name which may be used to prepare sustained release dosages according to the present invention.

Analgesic or antipyretic agents:
   Aspirin     Acetaminophen
Antibiotics:
   Penicillin     Oxytetracycline
   Tetracycline     Neomycin
   Chlortetracycline     Chloramphenicol
Antihistaminics:
   Brompheniramine     Pheniramine
   Carbinoxamine     Rotoxamine
   Chlorpheniramine
Antispasmodic agents:
   Atropine     Poldine
   Hyoscyamine     Scopolamine
   Glycopyrrolate
Antitussive agents:
   Dextromethorphan     Noscapine (narcotine)
Diuretics:
   Aminophyllin     Benzthiazide
Hormones:
   Dienestrol     Methyltestosterone
   Dexamethasone     Progestrone
   Diethylstilbestrol     Hydrocortisone
Hypotensives and vasodilatiors:
   Pentaerythrityl tetranitrate     Nitroglycerin
   Erythrityl tetranitrate
Sedatives and hypnotics:
   Pentabarbital     Carbromal
   Phenobarbital     Barbital
   Secobarbital     Amobarbital
   Codeine     Butabarbital
   Bromisovalum
Sulfonamides:
   Sulfamethoxydiazine     Sulfaethidole
Sympathomimetic agents:
   Dextro-amphetamine     Phenylephrine
   Racemic amphetamine     Phenylpropanolamine
   Methamphetamine
Tranquilizers:
   Butaperazine     Reserpine
   Chlorpromazine     Thiopropazate
Vitamins:
   Thiamine     Pyridoxine The matrix material is prepared by melting the lipid and then adding the colloidal silica to the melt. The colloidal silica disperses in the melt to form an optically clear gel, the viscosity of which may be increased by increasing the colloidal silica content. The desired pharmaceutically active agent, such as a drug, is pulverized to a fine powder, desirably less than sixty-mesh, and mixed into the molten gel. The mass is then congealed, cut or broken into convenient granules, and compressed into tablets, or prepared in other dosage forms.

In vitro testing of the rate of drug release of the present composition demonstrates a uniform release rate over a prolonged period of time. Moreover, when the experimeans are repeated utilizing the same compositions, consistently precise duplications of the original results are obtained.

The present invention has many advantages over other means and methods of producing sustained release dosage forms, even over those utilizing the matrix concept. One major advantage is ease of manufacture. The present method eliminates the need for wet granulating solutions, the preparations of which are tedious and time consuming. The present invention eliminates the use of organic solvents, with their associated toxicity and flamability problems. Moreover, the time and cost involved in solvent removal is eliminated.

An additional advantage of the present composition is that tablets formed thereof have greatly improved physical properties over those formed from prior compositions. For example, when tablets are formed, utilizing matrix materials of the prior art, the finished tablet often has poor flow properties. Moreover, heat generated during the continuous operation of tablet machines causes the prior art materials to stick to the punches. Additionally, the prior compositions often form soft tablets that may cap or split. The addition of lubricants to the prior granules has not always been successful in alleviating manufacturing difficulties. In contrast, compositions comprising the present lipid-colloidal silica compositions form extremely firm, hard tablets. Flow properties are excellent, and problems resulting from capping, splitting and sticking are nonexistent.

Relatively low melting lipids, which melt rapidly and with low heat expenditures, are the principal matrix components. The number of manufacturing operations may be kept to an absolute minimum. Wet granulation and drying are eliminated, as well as distribution of lubricant into the final granulation. Because of the fine flow properties resulting from the granulation, tablets may be manufactured at an extremely rapid rate. This is not true of prior matrix forming materials.

The strength of the resulting tablets is greater than that of tablets formed from other matrix-forming materials. Thus, they may be subjected to any desired further pharmaceutical processing.

Another major advantage of the present invention is the precision of reproducibility of the release patterns. In prior art matrices materials of different melting points are used. This sometimes results in nonhomogeneous conditions due to the separation of the various materials. In the present invention the resulting matrices are homogeneous.

Still another advantage resides in the fact that the lipids are used to prepare the matrices of the present invention are much less expensive than matrices used in the prior art. Moreover, since the temperature required for processing is much lower than for other matrices, thermolabile drugs may be employed in the invention. Also, even where these low orders of heat are deleterious to the drug, an alternative method of processing is available, in that the matrix may be prepared by forming a dough-like mass from the lipid by addition of a suitable solvent such as n-propanol. Addition of the colloidal silica to this dough-like mass results in gel formation. Subsequent addition of drug, removal of solvent and, finally, processing by the same techniques as described above, gives identical results.

Still another advantage is that variation in release rate can be readily regulated by the method of the invention. Addition of water-soluble inorganic salts or other water-soluble pharmacologically inert compounds such as glycine, urea, or polyethylene glycol accelerates drug release. Furthermore, water-soluble gums, such as methyl cellulose, polyvinylpyrrolidone, or polyvinyl alcohol, or water-insoluble hydrophilic fillers, such as microcrystalline cellulose, increase drug release rate. Also, drug release rate may be increased by increasing drug solubility through the inclusion of an appropriate additive or by chemically altering the drug. If it is desired to decrease drug release rate, the drug may be chemically modified to decrease solubility. Otherwise, this may be accomplished by addition of a lipid-soluble, water-insoluble polymer to the matrix. Ethyl cellulose in concentrations under 15% is convenient for this purpose.

Finished pharmaceutical dosage forms may be prepared in any of a number of ways. It is generally desirable to have a portion of the drug readily and rapidly available. The core tablets can be pan coated by conventional techniques with an initial dose of drug applied in the coating. Alternatively, the core tablets may be film-coated with water-soluble film-forming agents so that the initial drug dose is included within the film. Another alternative is compression coating of the core tablets with a coating containing the initial dose of drug.

The following examples are given by way of illustration only and are not to be constructed as limiting.

EXAMPLE 1

Preparation of phenobarbital-methamphetamine tablets

A composition for preparing tablets is provided by first measuring out the following ingredients in the stated amounts:

| | Gm./10,000 tablets |
|---|---|
| Methamphetamine hydrochloride | 67 |
| Phenobarbital | 432 |
| Sodium phosphate, tribasic, monohydrate | 225 |
| Cabosil M-5 (silica) | 230 |
| Stearyl alcohol | 1046 |
| Batch weight | 2000 |

The first three ingredients are mixed and comminuted to a fine powder. The stearyl alcohol is melted in a Hobart bowl. The Cabosil is added to the melt. Finally the powder mixture is added to the melt. The mass is congealed by cooling. Granules are prepared by use of an oscillating granulator with a 12-mesh screen. The granules are compressed on a rotary tablet machine, using 11/32″ deep concave punches. Tablets are finished by conventional pan coating, and methamphetamine hydrochloride and phenobarbital are applied to the coating so that the final tablet contains ⅓ the amount of these ingredients in the coating.

EXAMPLE 2

Preparation of brompheniramine tablets

A table core is prepared from the following ingredients in the stated amounts:

| | Gm./10,000 tablets |
|---|---|
| Brompheniramine maleate | 80 |
| Sodium chloride | 100 |
| Cabosil M-5 (silica) | 300 |
| Cetyl alcohol | 1120 |
| Batch weight | 1600 |

The core is prepared by the same method as described above in Example 1. The cores are formed on a Manesty Dry Cota, using 11/32″ flat faced punches.

A coating formulation is prepared by mixing ingredients as follows:

| | Gm./10,000 tablets |
|---|---|
| Brompheniramine maleate | 40 |
| Avicel (highly purified crystalline cellulose; MW 30,000–50,000; particle size 10–50 microns) | 1525 |
| Cabosil M-5 (silica) | 5 |
| Stearic acid | 30 |
| Color | q.s. |
| Batch weight | 1600 |

The coatings are applied to the cores utilizing 7/16″ flat faced punches for the coating.

In the following examples tablets were prepared from the stated ingredients in the stated proportions, and according to the procedure already described.

EXAMPLE 3

Sustained release antihistamine-decongestant

| | Gm./10,000 tablets |
|---|---|
| Phenylephrine HCl | 100 |
| Phenylpropanolamine HCl | 100 |
| Chlorpheniramine maleate | 80 |
| Silica, colloidal | 400 |
| Hydrogenated cocoanut oil | 1620 |
| Batch weight | 2300 |

The first three ingredients are milled together. The hydrogenated cocoanut oil is then melted and the colloidal silica added thereto. The milled materials are then dispersed in the melt which is permitted to congeal. The congealed composition is comminuted to produce granules of approximately 12-mesh. The granular material is utilized to prepare ⅜″ standard-curvature tablets. The tablets are finished by conventional pan coating, with sufficient amounts of drugs applied to the coating so that ⅓ of the total quantities of each of the drugs is in the coating.

EXAMPLE 4

Sustained release quinidine sulfate tablet

| | Gm./10,000 tablets |
|---|---|
| Quinidine sulfate-60 mesh | 1500 |
| Ethyl cellulose | 200 |
| Stearyl alcohol | 2000 |
| Silica, colloidal | 300 |
| Batch weight | 4000 |

The stearyl alcohol is melted and the colloidal silica added thereto. Next the ethyl cellulose is added to the melt. Finally the quinidine sulfate is dispersed into the melt and the melt congealed. The congealed mass is passed through an oscillating granulator fitted with a 10-mesh screen. The granules are compressed using 13/32″ flat faced punches to form tablets.

EXAMPLE 5

Sustained release glycopyrrolate-phenobarbital tablet

| | Gm./10,000 tablets |
|---|---|
| Glycopyrrolate | 20 |
| Phenobarbital | 130 |
| Phenobarbital sodium | 570 |
| 12-hydroxystearic acid | 730 |
| Silica, colloidal | 250 |
| Microcrystalline cellulose | 100 |
| Batch weight | 1800 |

The first three ingredients are mixed and the mixture milled to form a 60-mesh powder. The 12-hydroxystearic acid is then melted. First the colloidal silica, then the milled drugs, and finally the microcrystalline cellulose are added and mixed into the melt. The melt is permitted to congeal, and the congealed mass passed through a comminuter assembled with a 10-mesh screen. Tablets are prepared from the comminuted mass using 13/32″ standard-curvature punches and dies.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

I claim:

1. A compressible colloidal silica-pharmaceutical lipid medicinal gel matrix fragment having a ratio by weight of lipid to colloidal silica of about 3:1 to about 8:1, produced from a congealed matrix comprised of the following: (a) a pharmaceutically active agent pulverized to a fine powder, less than 60 mesh, (b) a rapidly melting, relatively low melting lipid selected from the group consisting of fatty alcohols having 16 to 44 carbon atoms, fatty acids having 12 to 28 carbon atoms, esters derived from alcohols having 2 to 44 carbon atoms and acids having 2 to 28 carbon atoms, esters of aliphatic polyhydroxy compounds having 3 to 6 carbon atoms with fatty acids having 10 to 28 carbon atoms, esters of aliphatic polyhydroxy compounds having 3 to 6 carbon atoms with fatty acids having 10 to 28 carbon atoms wherein at least some of the hydroxyl groups are esterified with fatty acids containing 2 to 4 carbon atoms, and waxes, and (c) a gel-forming colloidal silica having an ultimate particle size of about 2 to 20 millimicrons and a surface area of from 0.1 square meter per gram to about 3000 square meters per gram, said gel-forming silica and said pharmaceutically active agent having been admixed in the lipid while said lipid is in the molten state and said gel-forming silica having been dispersed in the lipid melt in a quantity sufficient to form an optically clear gel matrix, said congealed matrix having been cut or broken into conveniently-sized granules which are compressible into tablet form.

2. The product of claim 1, wherein the surface area of the colloidal silica is from about 100 to about 400 square meters per gram.

3. The product of claim 2, wherein the granules are up to about 12 mesh in size.

4. The product of claim 1, wherein the melting point of the lipid is about 50 to about 90° C.

5. The product of claim 1, wherein the lipid is selected from the group consisting of stearyl alcohol, cetyl alcohol, stearic acid, palmitic acid, hydrogenated castor oil, hydrogenated cocoanut oil, and 12-hydroxystearic acid.

6. The product of claim 1 in the form of a compressed tablet.

7. The product of claim 1 in the form of a compressed tablet core having a coating on said core comprising a pharmaceutically active agent in a pharmaceutically acceptable carrier providing rapid release of said pharmaceutically active agent.

References Cited

UNITED STATES PATENTS

| 2,793,979 | 5/1957 | Svadres | 167—82 |
| 2,951,791 | 9/1960 | Stearns | 167—82 |
| 2,951,792 | 9/1960 | Swintosky | 167—82 |
| 3,101,299 | 8/1963 | Ferrand | 167—82 |
| 3,147,187 | 9/1964 | Playfair | 167—82 |
| 3,148,124 | 9/1964 | Gaunt | 167—82 |

LEWIS GOTTS, *Primary Examiner.*

S. K. ROSE, *Assistant Examiner.*